US012640091B2

(12) United States Patent
Chen et al.

(10) Patent No.: US 12,640,091 B2
(45) Date of Patent: May 26, 2026

(54) DISPLAY SYSTEM WITH LIGHT SENSOR AND CONTROL METHOD THEREOF

(71) Applicant: SENSORTEK TECHNOLOGY CORP., Hsinchu County (TW)

(72) Inventors: Rong-Fong Chen, Hsinchu County (TW); Po-Chun Lin, Hsinchu County (TW)

(73) Assignee: SENSORTEK TECHNOLOGY CORP., Hsinchu County (TW)

( * ) Notice: Subject to any disclaimer, the term of this patent is extended or adjusted under 35 U.S.C. 154(b) by 0 days.

(21) Appl. No.: 18/648,503

(22) Filed: Apr. 29, 2024

(65) Prior Publication Data

US 2024/0428728 A1 Dec. 26, 2024

Related U.S. Application Data

(60) Provisional application No. 63/462,264, filed on Apr. 27, 2023.

(51) Int. Cl.
*G09G 3/3208* (2016.01)

(52) U.S. Cl.
CPC ... *G09G 3/3208* (2013.01); *G09G 2320/0626* (2013.01); *G09G 2360/144* (2013.01)

(58) Field of Classification Search
CPC ..... G09G 2320/0626; G09G 2360/144; G09G 3/3208; G09G 2360/145; G09G 2360/14; G09G 3/3233; G09G 3/342
See application file for complete search history.

(56) References Cited

U.S. PATENT DOCUMENTS

| | | | | |
|---|---|---|---|---|
| 11,295,670 | B2 * | 4/2022 | Kelly | G09G 3/3233 |
| 2017/0206844 | A1 | 7/2017 | Oshima et al. | |
| 2018/0336848 | A1 | 11/2018 | Suzuki et al. | |
| 2021/0233493 | A1 * | 7/2021 | Raynor | G09G 3/20 |
| 2021/0319753 | A1 | 10/2021 | Kelly et al. | |
| 2022/0051620 | A1 * | 2/2022 | Song | G09G 3/3233 |
| 2023/0169903 | A1 * | 6/2023 | Kim | G09G 3/3406 345/207 |

FOREIGN PATENT DOCUMENTS

| | | | |
|---|---|---|---|
| CN | 115516550 | A | 12/2022 |
| TW | 201133453 | A | 10/2011 |
| TW | 202213313 | A | 4/2022 |

OTHER PUBLICATIONS

Taiwan Intellectual Property Office Office Action Search report on Apr. 8, 2025.

* cited by examiner

*Primary Examiner* — Koosha Sharifi-Tafreshi
(74) *Attorney, Agent, or Firm* — WPAT, PC

(57) ABSTRACT

The present application relates to a display system with a light sensor and a control method thereof. The display system comprises a display module and a light sensor. The display module comprises a driving circuit for generating a driving signal. Said driving signal comprises a plurality of periodic pulse waves. The OFF time of one of the periodic pulse waves is extended to an extended time which is greater than the OFF time of the remaining periodic pulse waves. This ensures that the sensing result of the light sensor may not include the contribution of display light.

20 Claims, 7 Drawing Sheets

DISPLAY SYSTEM WITH LIGHT SENSOR AND CONTROL METHOD THEREOF

FIELD OF THE INVENTION

The present application discloses a display system with a light sensor, and a control method thereof, in particular to a display system with adjustment of the light sensor.

BACKGROUND OF THE INVENTION

In modern consumer electronics products (such as smartphones and tablet computers), manufacturers strive to maximize the display panel size. To achieve this, they relocate circuit components originally placed on the display panel frame to beneath the display area, thereby eliminating the space occupied by these components on the frame and further reducing the bezel size. This approach allows electronic products to incorporate larger display panels within a fixed external size, achieving a better screen-to-body ratio. Currently, circuit components that may be moved under the display panel include cameras, fingerprint sensors, and various light sensors, etc.

When the light sensor is disposed under the display panel, the operation of the circuit components of the light sensor may be affected by the light emitted by the display panel. For example, the light sensor under the screen may directly or indirectly receive the display light emitted by the display pixels through glass reflection, causing distortion of the sensing results. Since display pixels mainly emit visible light, the distortion is particularly noticeable for light sensors operating in the visible light spectrum, such as ambient light sensors.

As display technology advances towards eye protection technology and high refresh rates, the driving control conditions for the display panel are becoming more complex, which indirectly makes it more difficult to prevent display light from affecting the light sensor placed under the display panel. In the current existing technology, it mainly relies on computational analysis of the sensing results of the light sensor to distinguish the component of the display light in the light sensing results, and then further exclude it from the light sensing results.

Unfortunately, the above-mentioned computational analysis requires additional software and hardware resources. Besides, when the driving control conditions of the display panel change, or even when the content displayed on the display panel changes, it may make it difficult for the designed computational analysis method to exclude the display light component from the light sensing results correctly. Accordingly, there is clearly a need for improvement in this area.

SUMMARY OF THE INVENTION

An objective of the present application is to provide a display system with light sensor and a control method thereof. By extending the OFF time of one or more driving pulse cycles in the pulse width modulation (PWM) dimming control signal to an extended time, sufficient duration may be provided to the light sensor for completing a single integration operation. This ensures that the sensing result of the light sensor does not include the component of the display light.

The present application discloses a display system, which comprises a display module and a light sensor. The display module includes a display unit and a driving circuit. The driving circuit is coupled to the display unit and generate driving signals. The driving signals include a PWM dimming control signal. The light sensor includes a light sensing unit and a control circuit. The control circuit is coupled to the light sensing unit. The PWM dimming control signal includes a plurality of driving pulse cycles. The OFF time of one or more of the driving pulse cycles is extended to an extended time greater than the OFF time of the rest driving pulse cycles.

The present application discloses a control method of display system for controlling a display system comprising a display module and a light sensor. The control method comprises steps of: a driving circuit of the display module generating driving signals, the driving signals include a PWM dimming control signal; and a control circuit of the light sensor controlling and executing integration operations for generating a light sensing result. The PWM dimming control signal includes a plurality of driving pulse cycles. The display module extends the OFF time of one or more of the driving pulse cycles to an extended time greater than the OFF time of the rest driving pulse cycles.

DETAILED DESCRIPTION OF THE INVENTION

In order to make the structure and characteristics as well as the effectiveness of the present application to be further understood and recognized, the detailed description of the present application is provided as follows along with embodiments and accompanying figures.

In the specification and subsequent claims, certain words are used for representing specific devices. A person having ordinary skill in the art should know that hardware manufacturers might use different terms to refer to the same device. In the specification and subsequent claims, the differences in terminology are not used for distinguishing devices. Instead, the differences in functions are the guidelines for distinguishing. Throughout the specification and subsequent claims, the word “comprising” is an open language and should be interpreted as “comprising but not limited to”. Besides, the word “couple” includes any direct and indirect electrical connection. Thereby, if the description is that a first device is coupled to a second device, it means that the first device is electrically connected to the second device directly, or the first device is connected electrically to the second device via other device or connecting means indirectly.

To elucidate the primary technical problems addressed by the present application, the following explanations are provided.

The display panels used in modern consumer electronics products are mainly organic light-emitting semiconductor (OLED) display panels. The dimming methods for OLED panels are briefly described below, with the current mainstream methods including analog DC (Direct Current) dimming and pulse width modulation (PWM) dimming.

Figure 1A:
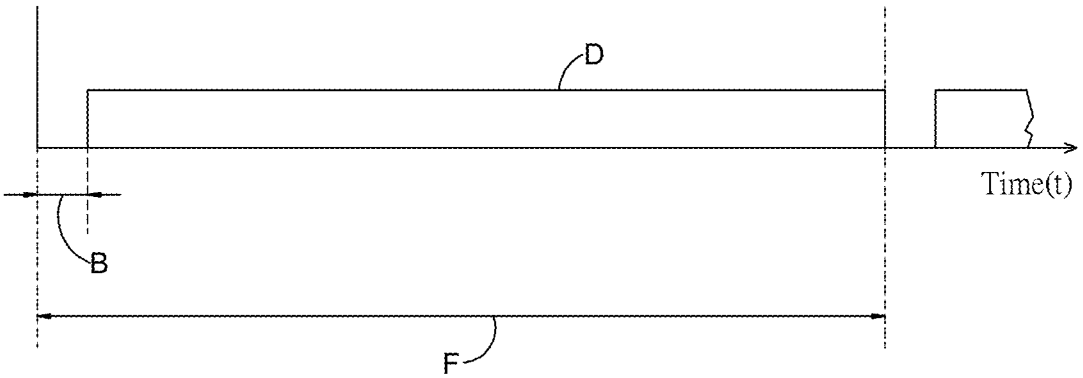
FIG. 1A shows a schematic diagram of the signal in the analog DC dimming.

Please refer to FIG. 1A. The analog DC dimming is usually used in high-brightness mode. Coordinating with the frame rate of the display panel, there will be a blanking time B between the driving pulses D of each frame F. For instance, with a frame rate of 120 Hz and the blanking time B accounting for approximately 5% of the driving pulse D, the blanking time B can be calculated to be approximately $1 \div 120 \times 5\% \approx 416$ μs. The blanking time B may be equivalently understood as the time when the display panel does not emit light, and this blanking time B is usually sufficient for the ambient light sensor to complete the integration operation to produce a sensing result of ambient light that is not affected by the display light.

Figure 1B:
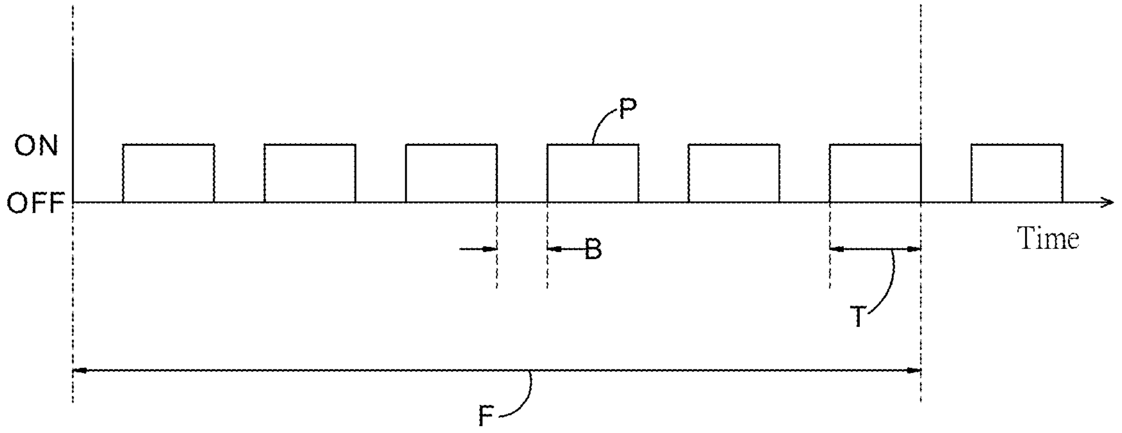
FIG. 1B shows a schematic diagram of the signal in the PWM dimming.

Please further refer to FIG. 1B. The PWM dimming is a technology that adjusts the brightness of the display panel by rapidly switching display pixels on and off, conserving energy and offering smoother, more precise brightness control compared to the analog DC dimming. The PWM dimming may be used in various brightness modes. Due to the poor display performance of the analog DC dimming at low brightness, it is typically used in high-brightness modes, while the PWM dimming is applied to low-brightness modes. Each driving pulse period (Period) P of the PWM dimming includes an ON time T and an OFF time B. Since the driving pulse cycle P depends on the PWM dimming operating frequency, the longer the ON time T, the shorter the OFF time B, and vice versa. The duty cycle of the PWM dimming is the ratio of the ON time in a driving pulse cycle P. The OFF time B may be regarded as the time when the display pixel is not driven to emit light between any two adjacent driving pulse cycles P, which is similar to the blanking time B described in the aforementioned analog DC dimming, and may be equivalently understood as the time when the panel does not emit light.

If the PWM dimming operating frequency is 360 Hz and with a 50% duty cycle, the OFF time B of the above PWM dimming may be calculated to be approximately $1 \div 360 \times 50\% \approx 1388$ μs. This OFF time B is sufficient for the ambient light sensor to complete the integration operation. However, new driving technologies for PWM dimming panels employ high refresh rates to reduce display panel flicker beyond human perception. For instance, the PWM dimming operation is operated at 1440 Hz, 1920 Hz, and 2160 Hz, 3840 Hz, and other higher frequencies. Taking 1440 Hz as an example, if the duty cycle is still 50%, the OFF time B will be reduced to $1 \div 1440 \times 50\% \approx 347$ μs. Although this OFF time B should still sufficient for the ambient light sensor to complete its integration calculation, it is notably smaller than the 416 μs blanking time B illustrated in the aforementioned analog DC dimming.

It should be noted that the PWM dimming adjusts the brightness of the display panel through the duty cycle. Therefore, to increase the brightness of the display panel at the operating frequency of 1440 Hz, the duty cycle might need to be increased to 90%. In this scenario, the OFF time B would be significantly reduced to $1 \div 1440 \times 10\% \approx 69$ μs. This OFF time B of less than 100 μs is no longer sufficient for the ambient light sensor to complete the integration calculation. Consequently, the sensing result of the ambient light sensor will inevitably include the component of the display light, meaning that correcting the sensing result of ambient light sensor through computational analysis according to some existing technologies will be ineffective. Specifically, some existing technologies continuously store and record several sensing results of ambient light and take the minimum value to determine the sensing result of ambient light that is not affected by the display light. This method becomes inapplicable when the OFF time B is too small, as any sensing result of ambient light will inevitably contain the a display light component.

In the following, various embodiments will be used to further illustrate the characteristics of the display system and the control method thereof disclosed according to the present application, the accompanying circuit components, and how to solve the above technical problems.

Figure 2:
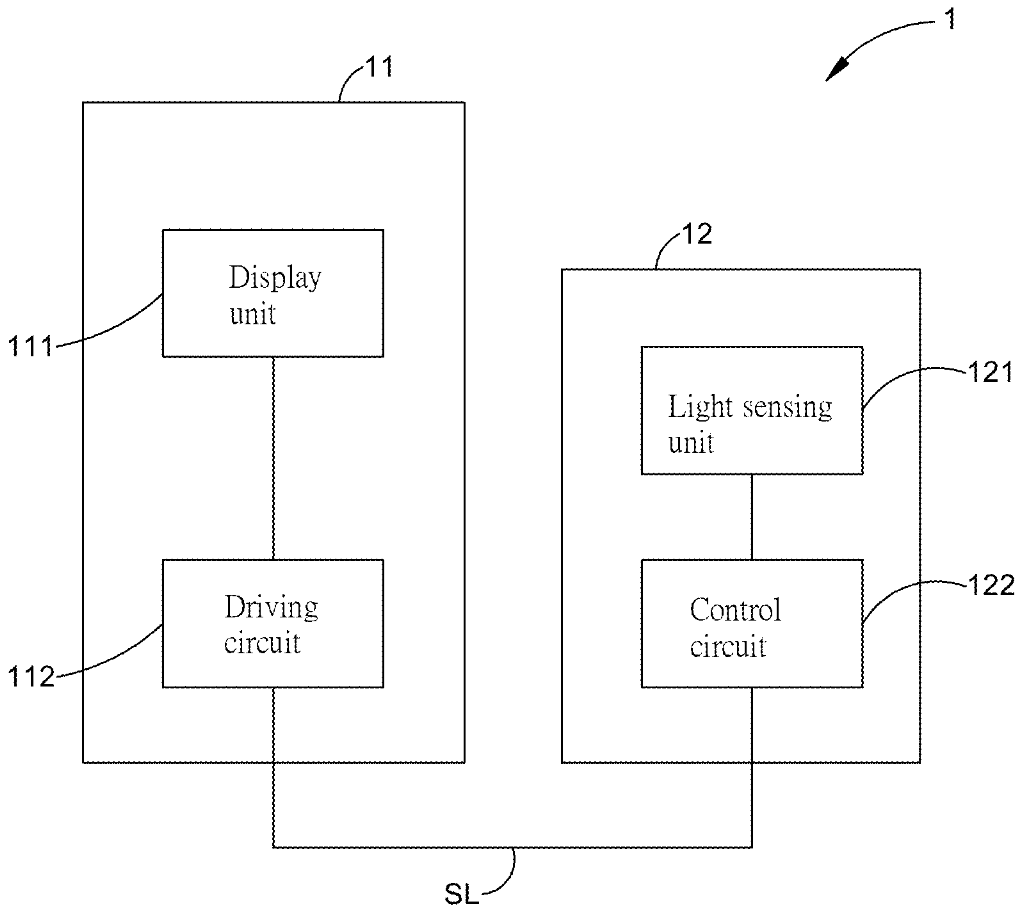
FIG. 2 shows a schematic diagram of the architecture of the display system according to an embodiment of the present application.

First, please refer to FIG. 2, which shows a schematic diagram of the architecture of the display system 1 according to an embodiment of the present application. As shown in the figure, the display system 1 according to the present application comprises a display module 11 and a light sensor 12. The display module 11 includes a display unit 111 and a driving circuit 112. The display unit 111 may include display panels such as organic light-emitting diodes (OLED) displays. The driving circuit 112 is coupled to the display unit 111 for generating driving signals and controlling the display pixels of the display unit 111 to emit display light. The driving signals generated by the driving circuit 112 at lease include a PWM dimming control signal.

The light sensor 12 includes a light sensing unit 121 and a control circuit 122. The light sensor 12 may be disposed under the display unit 111 of the display module 11. Therefore, the light sensor 12 of the display system 1 according to the present embodiment may be of an under-screen design. Even if the light sensor 12 were positioned on the frame of the display module 11 as in the prior art, if the light sensor 12 is affected by the display light emitted by the display unit 111, the present application may still be used to solve the problem. The light sensing unit 121 and the control circuit 122 according to the present embodiment may be integrated into an integrated-circuit chip. Nonetheless, the invention is not limited to the embodiment. However, this is not a limitation of the invention. The light sensing unit 121 and control circuit 122 may be positioned separately beneath the display unit 111 and coupled to each other.

The light sensing unit 121 may include a photosensitive device such as a photodiode, and the control circuit 122 is coupled to the light sensing unit 121 for receiving the sensing current generated by the light sensing unit 121 and controls circuit components such as analog-to-digital conversion circuits to execute integration and other calculation and produce light sensing results. If the light sensing unit 121 senses visible light, the light sensor 12 may function as an ambient light sensor. The present embodiment uses an ambient light sensor as an example because most of the display light emitted by the display unit 111 is visible light. Consequently, the impact is particularly significant for ambient light sensors and other light sensors 12 operating in the visible light spectrum. Similarly, the present application can certainly be used to address issues with other types of light sensors that are susceptible to visible light interference.

Figure 3:
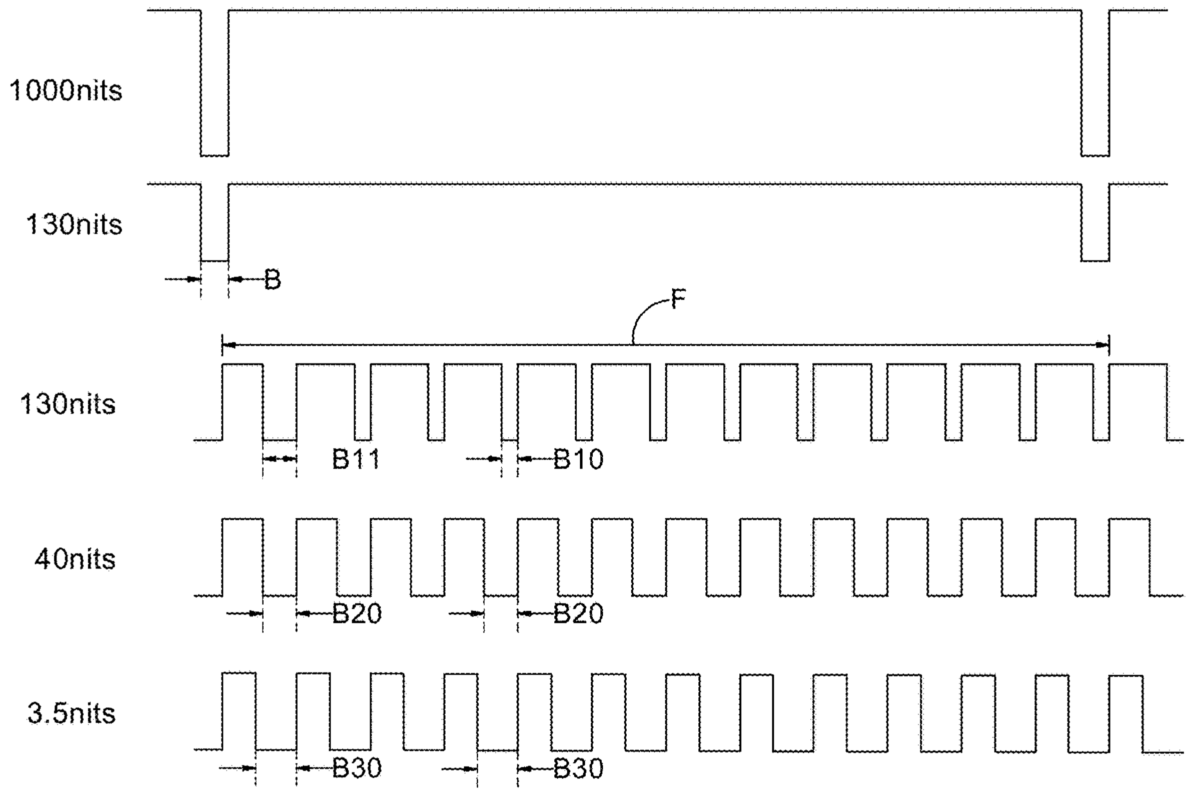
FIG. 3 shows a schematic diagram of a portion of driving signals generated by the driving circuit of the display system according to an embodiment of the present application.

Please refer to FIG. 3, which shows a schematic diagram of a portion of driving signals generated by the driving circuit 112 of the display module 11 in the display system 1 according to an embodiment of the present application. As mentioned above, in current industry practice, high-brightness modes usually use the analog DC dimming, while low-brightness modes use the PWM dimming. Therefore, in addition to the PWM dimming control signal generated by the driving circuit 112, the driving circuit 112 may also generate an analog DC dimming control signal. As shown in the figure, assuming that 130 nits is the threshold brightness. The analog DC dimming is used when the brightness is higher than 130 nits. Then the driving circuit 112 may generate driving signals of different power values in response to different brightness levels. For example, for 1000 nits, a driving signal with higher power is generated; for 130 nits a driving signal with lower power is generated. However, regardless of the level of power, if the frame rate of the analog DC dimming control signal remains unchanged, the blanking time between the driving pulses of each frame should be the same or similar. For example, for the aforementioned frame rate of 120 Hz, given the blanking time accounting for approximately 5% of the driving pulse, the blanking time B is approximately $1 \div 120 \times 5\% \approx 416$ μs.

The improvement of the present application mainly lies in the use of PWM dimming when the brightness is lower than 130 nits. The driving circuit 112 needs to generate PWM dimming control signals with different duty cycles in response to different brightness levels. For example, for 130 nits, the duty cycle of the PWM dimming control signal is 95%; for 40 nits, the duty cycle of the PWM dimming control signal is 40%; and for 3.5 nits, the duty cycle of the PWM dimming control signal is 10%. It is noted that before the embodiment according to the present application is used, assuming that the PWM dimming operating frequency is 1440 Hz, for 130 nits, the OFF time B10 of the PWM dimming control signal is approximately $1 \div 1440 \times 5\% \approx 34$ μs; for 40 nits, the OFF time B20 of the PWM dimming control signal is approximately $1 \div 1440 \times 60\% \approx 416$ μs; and for 3.5 nits, the OFF time B30 of the PWM dimming control signal is approximately $1 \div 1440 \times 90\% \approx 625$ μs.

Under the conditions of 40 nits and 3.5 nits, the OFF times B20 and B30 of the PWM dimming control signal are sufficient for the control circuit 122 of the light sensing unit 12 to complete the integration operation. Therefore, no adjustment is required for the display system 1 according to the present application. However, under the condition of 130 nits, the OFF time B10 of the PWM dimming control signal has been reduced to a duration insufficient for the control circuit 122 to complete the integration operation. Therefore, the display system 1 of the present application controls the driving circuit 112 of the display module 11 to adjust the PWM dimming control signal, extending one or more OFF time B10 to an extended time B11. For example, the OFF time B10 on the far left side of a frame F in FIG. 3 (originally about 34 μs) may be extended to an extended time (about 416 μs). The other OFF times B10 of the PWM dimming control signal may be left unchanged or adjusted accordingly. This is because the duration of a frame F is fixed. When an OFF time B10 is extended to an extended time B11, the ON times of one or multiple driving pulse cycles of the PWM dimming control signal may be reduced to keep the duration of the frame F fixed, so that the other OFF times B10 remain unchanged. Alternatively, the frame duration F may be kept fixed by reducing the remaining OFF times B10. Users may choose which method imposes less impact on the visual effect of their own display units 111, as the characteristics of various display units 111 are different.

Generally speaking, the extended time B11 is preferably greater than 150 μs, which may provide sufficient duration for the control circuit 122 to complete a single integration operation. Furthermore, the extended time B11 is preferably greater than 300 μs, so that the multiple integration operations executed by the control circuit 122 have a higher probability of being executed within the extended time B11, given no signal transmission between the display module 11 and the light sensor 12. Once the extended time is selected, as long as the OFF time of the original PWM dimming control signal generated by the driving circuit 112 is less than the extended time, the display system 1 according to the present application may control the driving circuit 112 to extend one or more OFF time to the extended time.

If the user prefers, the extended time may be also set to a range of values. In other words, more than one extended time value may be set. For example, different extended times may be set according to different brightness levels. Although this approach may moderately reduce the influence on the OFF time or the ON time outside the extended time of the PWM dimming control signal, it will increase the complexity of the overall design of the display system. It depends on the practical needs of the user to evaluate whether to use the range values as the extended time. In any case, such simple changes derived from the embodiments of the present application do not depart from the scope of protection of the present application.

On the other hand, in the aforementioned embodiment of the present application, the extended time is set to approximately 416 μs, making it close to the blanking time of the analog DC dimming control signal, which is also around 416 μs. This approach provides consistency in system parameters. Generally, this may slightly reduce the design difficulty of the control circuit 122 of the light sensor 12.

Please continue to refer to FIG. 2. In the architecture of the display system 1 according to another embodiment of the present application, the driving circuit 112 of the display module 11 may be coupled to the control circuit 122 of the light sensor 12. Thereby, when the PWM dimming control signal generated by the driving circuit 112 includes an extended time, the driving circuit 112 may output a control signal SL to the control circuit 122, allowing the control circuit 122 to spontaneously execute the integration operation during the extended time. In this way, it can be ensured that the integration operation of the control circuit 122 is executed when the display module 11 does not emit light, and may even be directly used as the final sensing result of ambient light (or the final sensing result of other forms of light sensors) for outputting, requiring no additional software and hardware resources for analysis and calculations.

Another significant benefit of the present embodiment is that the selection of the extended time is more flexible. As mentioned above, in the previous embodiment, the extended time is preferably greater than 300 μs so that the multiple integration operations executed by the control circuit 122 have a higher probability of falling within the extended time. However, according to the present embodiment, the driving circuit 112 may output the control signal SL to the control circuit 122, allowing the control circuit 122 to spontaneously execute the integration operation during the extended time. Therefore, there is no need to further extend the length of the extended time to meet the operational requirements of the light sensor 12. Choosing a shorter extended time may reduce the influence on the OFF times or ON times outside the extended time of the PWM dimming control signal.

Moreover, the complexity of the overall design of the display system may be reduced as well.

Based on the above two embodiments, the display system 1 according to the present application may also derive several variants, as detailed below.

Figure 4:
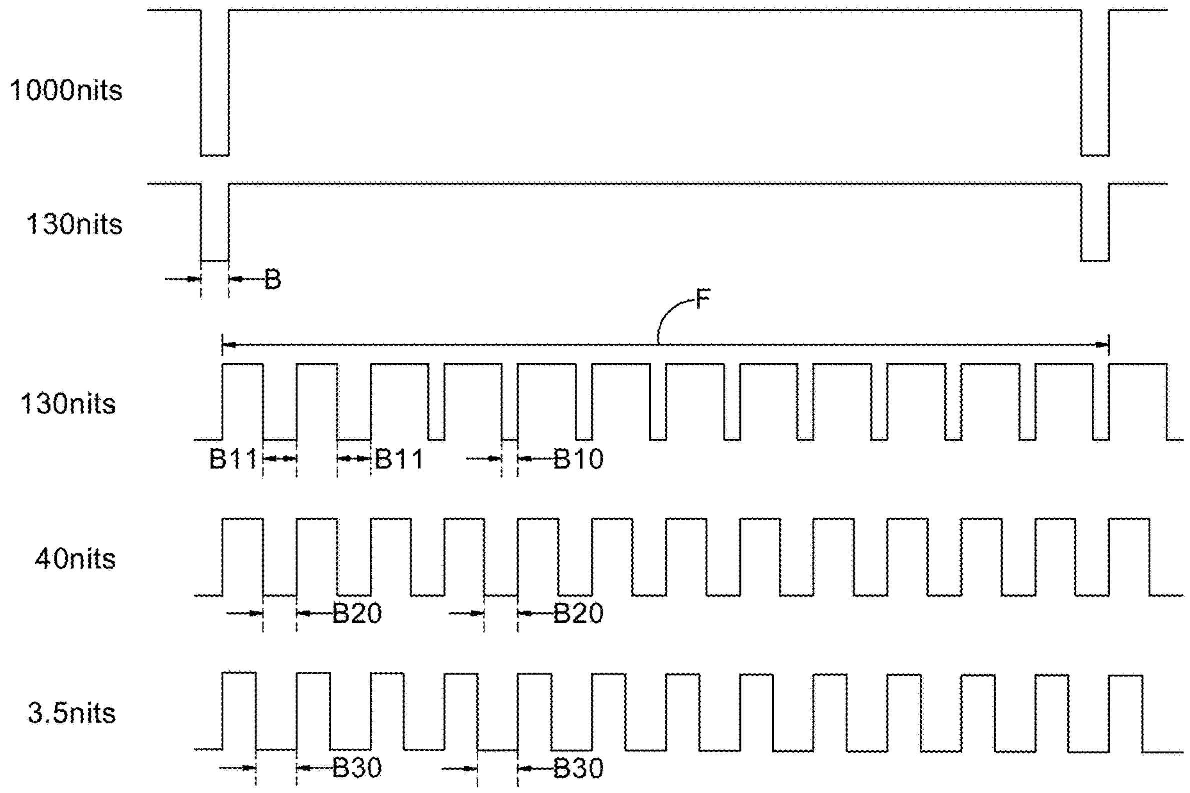
FIG. 4 shows a schematic diagram of a portion of driving signals generated by the driving circuit of the display system according to the first embodiment of the present application.

Please refer to FIG. 4, which shows a schematic diagram of a portion of driving signals generated by the driving circuit 112 in the display module 11 of the display system 1 according to the first embodiment of the present application. A person having ordinary skill in the art would know that, under the condition that the aforementioned frame rate is 120 Hz and the PWM dimming operating frequency is 1440 Hz, each frame F will contain 12 driving pulse cycles. That is to say, there are 12 original OFF times B10. In the foregoing embodiment, it was only mentioned that one OFF time B10 is extended into an extended time B11. However, according to the present embodiment, two consecutive OFF times B10 may be also extended into an extended time B11. It should be noted that the more OFF times B10 that is extended into the extended time B11, the greater the associated influence on the remaining OFF times or ON times.

Figure 5:
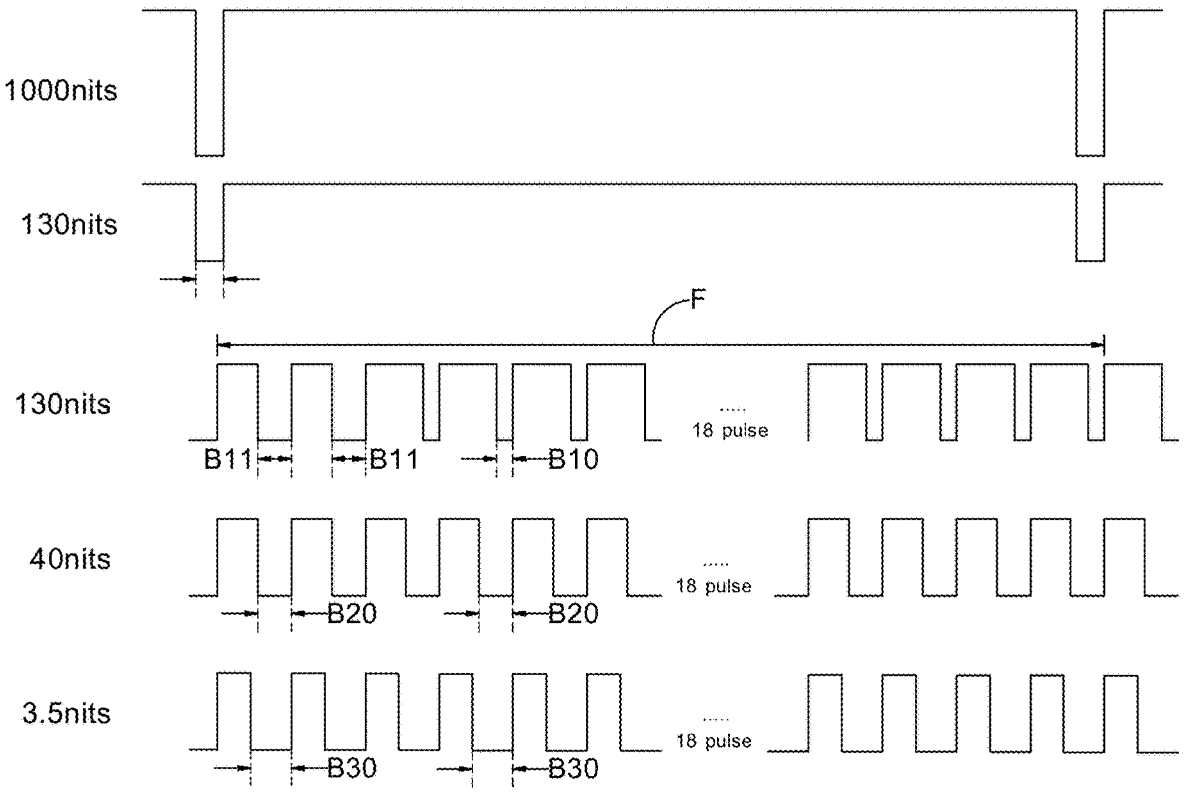
FIG. 5 shows a schematic diagram of a portion of driving signals generated by the driving circuit of the display system according to the second embodiment of the present application.

Please refer to FIG. 5, which shows a schematic diagram of a portion of driving signals generated by the driving circuit 112 in the display module 11 of the display system 1 according to the second embodiment of the present application. The aforementioned condition that the PWM dimming operating frequency is 1440 Hz is just an example. In other display modules 11 or for display modules 11 with variable operating frequencies of PWM dimming, the operating frequency may be higher or lower. Taking the higher operating frequency of 2160 Hz as an example, under the same frame rate of 120 Hz, each frame F will contain 18 driving pulse cycles, resulting in a shorter original OFF time. For example, for 130 nits, the OFF time B10 of the PWM dimming control signal is about $1 \div 2160 \times 5\% \approx 23$ μs; for 40 nits, the OFF time B20 is about $1 \div 2160 \times 60\% \approx 277$ μs; and for 3.5 nits, the OFF time B30 is approximately $1 \div 2160 \times 90\% \approx 416$ μs.

Faced with this situation, under the condition of 130 nits, the display system 1 according to the present application obviously still needs to adjust the PWM dimming control signal generated by the driving circuit 112 by controlling the driving circuit 112 of the display module 11 to extend one or more OFF times B10 to an extended time B11. The difference in the present embodiment is that under the condition of 40 nits, although the OFF time B20 (originally about 277 μs) should still be sufficient for the control circuit 122 of the light sensing unit 12 to complete the integration operation, it is actually less than 300 μs. Therefore, if the extended time set by the user according to the present application is greater than 300 μs, the display system 1 should also adjust the PWM dimming control signal generated by the driving circuit 112 to extend one or more OFF time B20 to an extended time. On the contrary, if the extended time set by the user according to the present application is not greater than 300 μs or the set extended time is a range of values as mentioned above, the display system 1 according to the present application does not need to adjust the OFF time B20 for 40 nits.

Figure 6:
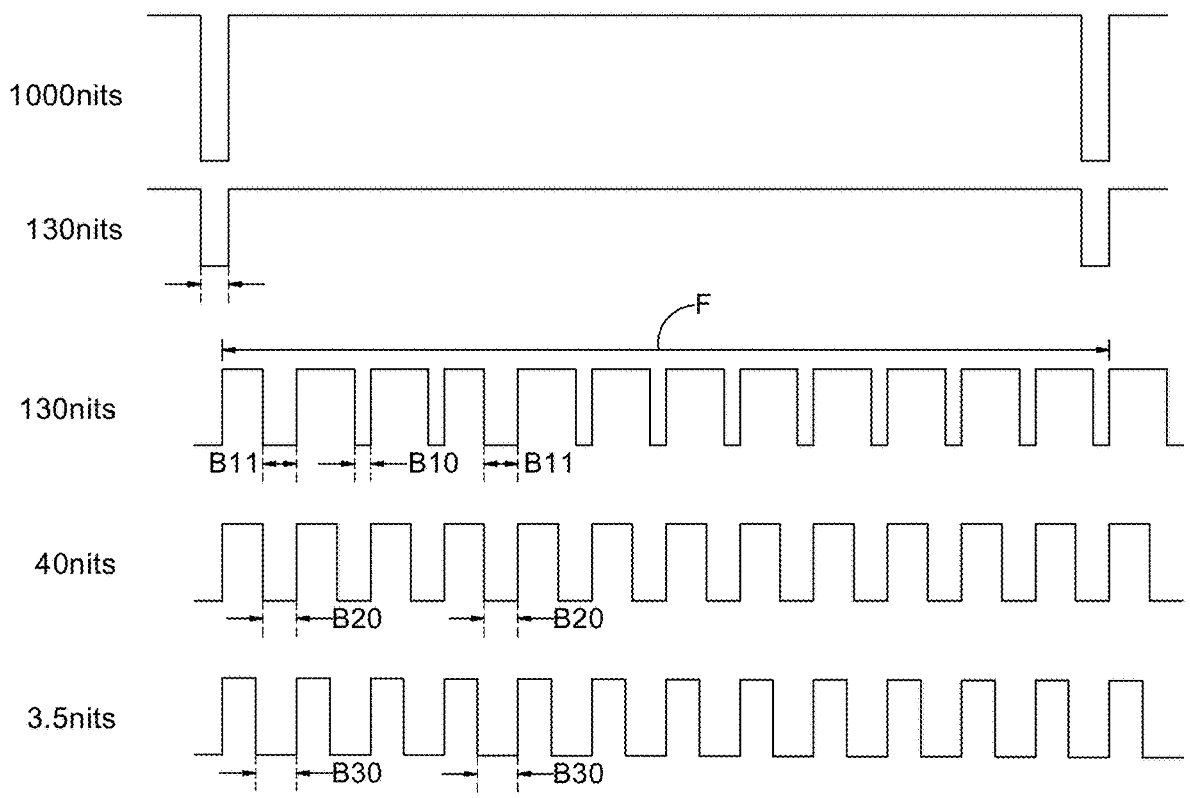
FIG. 6 shows a schematic diagram of a portion of driving signals generated by the driving circuit of the display system according to the third embodiment of the present application.

Please refer to FIG. 6, which shows a schematic diagram of a portion of driving signals generated by the driving circuit 112 in the display module 11 of the display system 1 according to the third embodiment of the present application. The difference from the first embodiment is that: when a plurality of OFF times B10 need to be extended to the extended time B11, in addition to extending two (or more) consecutive OFF times B10 to the extended time B11, two (or more) non-consecutive OFF times B10 may be also extended according to the present embodiment.

Furthermore, the brightness conditions recorded in the foregoing two embodiments of the present application and their corresponding derivatives are examples only. For instance, if the threshold brightness originally adopted by the display module 11 is 200 nits instead of 130 nits, it will not impair the embodiment of display system according to the present application. In addition, even the display module 11 adopts PWM dimming at full brightness and does not use the analog DC dimming, the display system according to the present application is still applicable.

More importantly, although the foregoing descriptions are all described in units of frames, the present application does not limit the display system to extend the OFF time of one or more driving pulse cycles in each frame to an extended time. In practice, a person having ordinary skill in the art would understand that although providing one or more extended times for each frame may maximize the design flexibility of the light sensor, if the user does not need the light sensor to have a faster refresh rate after evaluation, the driving circuit may be designed to generate the PWM dimming control signals with extended time for every several frames (such as 2, 6, or 12 frames, etc.).

Besides, the aforementioned condition of the frame rate of 120 Hz is an example only. Even display modules adopting other frame rates are also applicable to the display system according to the present application. Moreover, since the variable frame rate display modules that are gradually being adopted nowadays often require a higher frame rate, a higher operating frequency for PWM dimming is required. Consequently, the demand for the display system according to the present application is urgent.

The control method of the display system in the foregoing two embodiments according to the present application may be summarized as follows.

In the control method of a display system, the controlled display system comprises a display module and a light sensor. The method comprises steps of: a driving circuit of the display module generating driving signals, the driving signals include a PWM dimming control signal; and a control circuit of the light sensor controlling and executing integration operations for generating a light sensing result. The PWM dimming control signal includes a plurality of driving pulse cycles. The display module extends the OFF time of one or more of the driving pulse cycles to an extended time greater than the OFF time of the remaining driving pulse cycles. Preferably, the extended time is greater than 150 μs; more preferably, the extended time is greater than 300 μm.

To sum up, the present application provides a display system with a light sensor and its control method. By extending the OFF time of one or more driving pulse cycles in the PWM dimming control signal to an extended time, the extended time may provide sufficient duration for the light sensor to complete a single integration operation. This ensures that the sensing result of the light sensor does not include the component of the display light. Thereby, the present application may effectively avoid the limitations of existing methods that rely on correcting light sensing results through computational analysis.

Moreover, according to a specific embodiment of the present application, the display module may further output a control signal to the light sensor, allowing the light sensor to execute integration operations during the extended time spontaneously. In this way, it can be ensured that the result of the integration operation of the control circuit is obtained when the display module is not emitting light, and may even be directly output as the final sensing result without consuming additional software and hardware resources for analysis and calculation.

Accordingly, the present application conforms to the legal requirements owing to its novelty, nonobviousness, and utility. However, the foregoing description is only embodiments of the present application, not used to limit the scope and range of the present application. Those equivalent changes or modifications made according to the shape, structure, feature, or spirit described in the claims of the present application are included in the appended claims of the present application.

The invention claimed is:

1. A display system, comprising:

a display module, including a display unit and a driving circuit, said driving circuit coupled to said display unit, said driving circuit generating driving signals, and said driving signals including a pulse width modulation (PWM) dimming control signal; and a light sensor, including a light sensing unit and a control circuit, and said control circuit coupled to said light sensor;

where said PWM dimming control signal includes a plurality of driving pulse cycles; and the OFF time of one or more of said driving pulse cycles is extended to an extended time greater than the OFF time of the remaining ones of said driving pulse cycles.

2. The display system of claim 1, wherein said extended time is greater than 150 microseconds.

3. The display system of claim 2, wherein said PWM dimming control signal includes a plurality of driving pulse cycles with OFF time less than 150 microseconds.

4. The display system of claim 1, wherein said extended time is greater than 300 microseconds.

5. The display system of claim 4, wherein said PWM dimming control signal includes a plurality of driving pulse cycles with OFF time less than 300 microseconds.

6. The display system of claim 1, wherein said control circuit of said light sensor controls the integration operations to generate a light sensing result.

7. The display system of claim 6, wherein said driving circuit of said display module is coupled to said control circuit of said light sensor; and said driving circuit outputs a control signal to said control circuit and drives said control circuit to execute the integration operations in said extended time.

8. The display system of claim 1, wherein said light sensing unit of light sensor includes a photodiode.

9. The display system of claim 8, wherein said light sensing unit of said light sensor senses visible light; and said control circuit receives the sensing current generated by said light sensing unit after sensing visible light.

10. The display system of claim 1, wherein said driving circuit generates said PWM dimming control signal with different duty cycles according to different display brightness levels.

11. The display system of claim 1, wherein said display unit includes organic light-emitting diode displays.

12. A control method of display system, for controlling a display comprising a display module and a light sensor, comprising steps of:

a driving circuit of said display module generating driving signals, said driving signals including a PWM dimming control signal; and a control circuit of said light sensor controlling and executing integration operations for generating a light sensing result;

where said PWM dimming control signal includes a plurality of driving pulse cycles; and said display module extends the OFF time of one or more of said driving pulse cycles to an extended time greater than the OFF time of the remaining ones of said driving pulse cycles.

13. The control method of display system of claim 12, wherein said extended time is greater than 150 microseconds.

14. The control method of display system of claim 13, wherein said PWM dimming control signal includes a plurality of driving pulse cycles with OFF time less than 150 microseconds.

15. The control method of display system of claim 12, wherein said extended time is greater than 300 microseconds.

16. The control method of display system of claim 15, wherein said PWM dimming control signal includes a plurality of driving pulse cycles with OFF time less than 300 microseconds.

17. The control method of display system of claim 12, wherein said driving circuit outputs a control signal to said control circuit and drives said control circuit to execute integration operations in said extended time.

18. The control method of display system of claim 12, wherein said control circuit receives the sensing current generated by a light sensing unit after sensing visible light.

19. The control method of display system of claim 12, wherein said driving circuit generates said PWM dimming control signal with different duty cycles according to different display brightness levels.

20. The control method of display system of claim 12, wherein said PWM dimming control signal is output to a display unit of said display module.

* * * * *